ORDINAL NUMBER OF OBSERVATION

ORDINAL NUMBER OF OBSERVATION

ORDINAL NUMBER OF OBSERVATION

ORDINAL NUMBER OF OBSERVATION

ORDINAL NUMBER OF OBSERVATION

INVENTOR
*SULHI H. YUNGUL*

BY

ATTORNEYS

United States Patent Office 3,188,559
Patented June 8, 1965

3,188,559
TELLURIC CURRENT METHOD OF DETERMINING ELLIPSE AREA BY SIMULTANEOUSLY MEASURING TWO VOLTAGES WITH A COLLINEAR THREE ELECTRODE ARRAY
Sulhi H. Yungul, College Station, Tex., assignor to California Research Corporation, San Francisco, Calif., a corporation of Delaware
Filed Jan. 19, 1961, Ser. No. 83,654
5 Claims. (Cl. 324—1)

This invention relates to geophysical prospecting, and more particularly to a method of geophysical prospecting using natural telluric currents. Still more particularly this invention relates to the determination of so-called relative ellipse area values by a more convenient and more precise new field method than the previous prior art methods.

In U.S. Patent 2,586,667, issued February 19, 1952, to G. Kunetz, the meaning of relative ellipse area values has been taught. That patent has also taught a method for determining relative ellipse area values at various points over a geographical region. The relative ellipse area at a geographical location is the ratio between the area swept by the telluric field vector at that location and the area swept simultaneously by the telluric field vector at a reference location. The determination of relative ellipse area values, as taught by Kunetz, involves simultaneous measurements at two or more stations. As each station arrays of electrodes are disposed in lines substantially perpendicular to each other, and voltages are measured between adjacent electrodes so as to measure at each station two substantially perpendicular components of the telluric field vector.

The present invention is directed to a method of determining relative ellipse area values without the necessity for simultaneous measurements at separated stations. In accordance with this method the necessity for simultaneous measurements of perpendicular components of the telluric field vector is eliminated. This new method involves the simultaneous measurements of two voltages at a single station with an electrode arrangement in the form of a simple collinear tripole. Time variations in the simultaneously measured voltages between the electrode pairs of collinear tripoles are then translated into the desired relative ellipse area values.

The object of the present invention is a simplified field method for determining relative ellipse area values.

A further object of the present invention is a method for determining relative ellipse area values wherein the necessity for simultaneous measurements of natural telluric currents at widely separated stations is eliminated, so that only a single field crew will be needed to make the desired measurements.

Another object of the present invention is to provide a new field method for determining relative ellipse area values that has greater precision than has been possible with the prior art methods.

Still another object of the present invention is to provide an analysis procedure for determining relative ellipse area values that is simpler, faster, and more adaptable to routine and automation than the procedure used in prior art methods.

Further objects and features of the invention will be readily apparent to those skilled in the art from the specification and appended drawings illustrating a preferred embodiment wherein.

Figure 1:
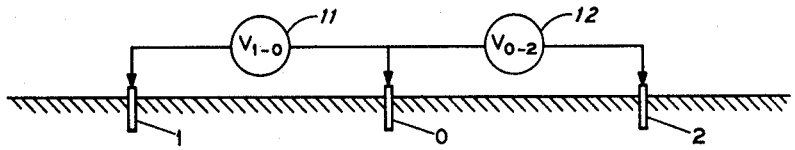
FIG. 1 is an illustration of the collinear tripole electrode arrangement used in the present invention.

FIG. 1 illustrates a collinear tripole electrode arrangement on a portion of the earth's surface as used in the method of the present invention. The electrodes 1, 0 and 2 are placed in the earth at equally-spaced positions along a straight line at the surface and in the plane of the section illustrated in FIG. 1. The distances between electrodes may be measured in thousands of feet while, without limitation thereto, I have found that under usual field conditions 2000 feet is a convenient working distance. The electrodes, 1, 0 and 2 should be of the nonpolarizable type (e.g. copper and copper sulfate) and are well known in the art of telluric exploration.

Also shown in FIG. 1 are a pair of voltmeters 11 and 12 connected between the electrodes 1, 0 and 2. The voltmeters 11 and 12 are connected to measure the voltage drop between electrodes 1 and 0 and between electrodes 0 and 2, respectively, that voltage drop being due to the flow of telluric currents through the resistive earth between the respective electrodes in response to telluric fields.

Figure 2:
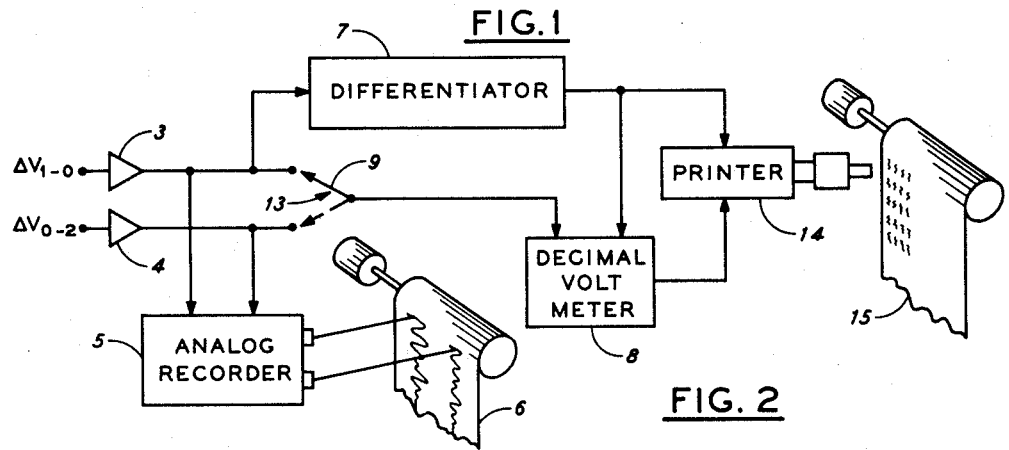
FIG. 2 is a block diagram of the apparatus employed to perform the analysis procedure of the present invention.
Figure 3:
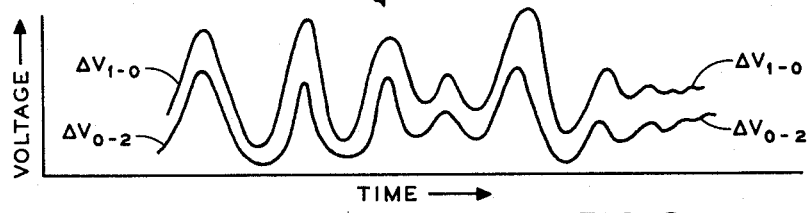
FIG. 3 is a representation of an analog record of telluric voltages measured between the electrodes of a collinear tripole as illustrated in FIG. 1.

The method of the present invention constitutes the processing of measured voltages between the pairs of electrodes in the collinear tripole electrode array to derive certain relationships between these measured voltages. To determine these relationships, the voltage differences between electrodes 1 and 0 and electrodes 0 and 2 are amplified by amplifiers 3 and 4 respectively, as shown in FIG. 2, and the two voltage drops are recorded as functions of time on the analog recorder 5 and displayed in record 6. In practice, a recording at a single station (one collinear tripole) is made for a time interval of 15 to 30 minutes. It has been found that a time interval of this duration represents the usually best compromise between the shorter time intervals desired for economy and the longer time intervals desired for greater precision. The analog record 6 of voltage $\Delta V_{1-0}$ and $\Delta V_{0-2}$ produced by the recorder 5 is known as a tellurogram and such a recording may appear somewhat as shown in FIG. 3. The two voltages $\Delta V_{1-0}$ and $\Delta V_{0-2}$ usually vary in a parallel fashion as shown and the usual dominant oscillations have a period of the order of 20 seconds. A record fragment like that illustrated in FIG. 3 may represent a recording over a time interval of a few minutes.

In accordance with the method of the present invention, it is desired to relate the instantaneous voltage drops measured at the collinear tripole electrode arrangement one to the other to determine certain characteristics of the earth between the respective electrode pairs. As shown in the aforementioned Kunetz patent, the determination of these characteristics may be accomplished by evaluating the variation in voltage drops measured between a base station and a measurement station. In accordance with the present invention I have found that the characteristics of the earth's subsurface formations can be determined by evaluating the voltage drops measured with the disclosed collinear electrode array by suitably processing the parallel fashion variation illustrated in the record 6 of FIGS. 1 and 3.

Figure 4:
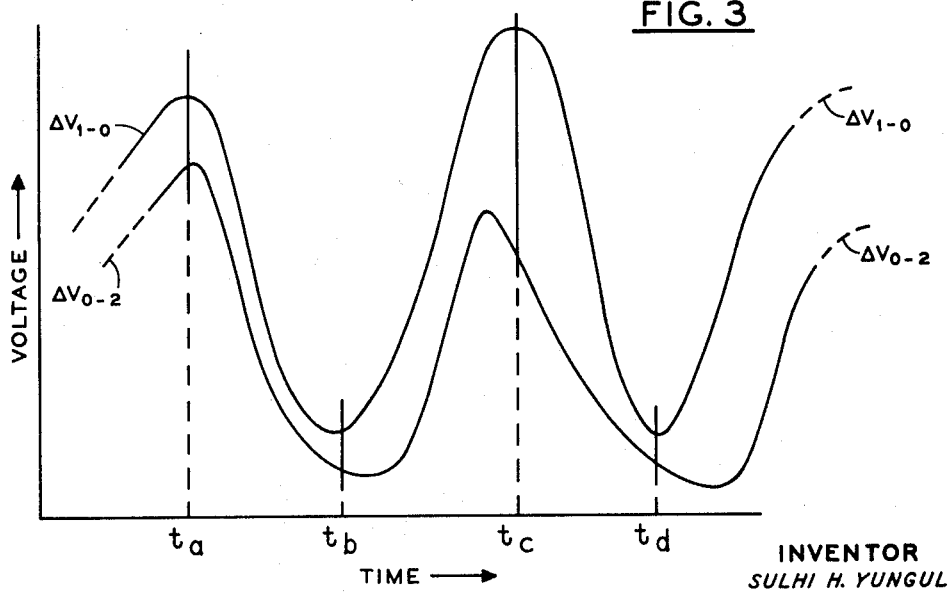
FIG. 4 is an enlarged portion of the record of FIG. 3.

Refer now to FIG. 4, representing a portion of the record of FIG. 3. In the present method, the voltages $\Delta V_{1-0}$ and $\Delta V_{0-2}$ are sampled at irregular time intervals, the intervals being preferentially selected so as to give the largest variations in at least one of the measured voltages. The sampling could be done by human means, but it is more convenient to do it automatically. As shown in FIG. 2, a differentiator 7 is connected to the channel that handles $\Delta V_{1-0}$ and the differentiator 7 senses the successive maxima and minima in the voltage $\Delta V_{1-0}$. By detecting successive maxima and minima the largest variations in measured voltages are identified. When the differentiator senses either a maximum or a minimum in $\Delta V_{1-0}$, it actuates a decimal voltmeter 8 energized in a suitable manner as, for instance, by being connected through the movable contact arm 9 of switch 13 to sample the voltage $\Delta V_{1-0}$. At a negligible time interval thereafter the decimal voltmeter 8 samples also $\Delta V_{0-2}$ by connecting movable contact arm 9 to the channel that handles $\Delta V_{0-2}$. In general, the maxima and minima in $\Delta V_{0-2}$ will not occur at precisely the same times as those in $\Delta V_{1-0}$ so if $\Delta V_{0-2}$ is sampled at substantially the same time that $\Delta V_{1-0}$ is at a maximum or minimum, $\Delta V_{0-2}$ will not be at a maximum or minimum. However, it will usually be very close to a maximum or minimum and that is all that is necessary. But it is neither desirable nor necessary that $\Delta V_{0-2}$ be at an extremum; all that is desirable is that there is a change in $\Delta V_{0-2}$ comparable to the change in $\Delta V_{1-0}$. Each time the decimal voltmeter senses a voltage from either $\Delta V_{1-0}$ or $\Delta V_{0-2}$, the printer 14 is energized to print on record 15 an indication of the measured voltage. The times and approximate positions along the record for sampling these voltages are illustrated in FIG. 4 as $t_a$, $t_b$, $t_c$ and $t_d$.

The quantities that are of chief importance in the present method are the ratios of the change in $\Delta V_{1-0}$ to the change in $\Delta V_{0-2}$. Referring to FIG. 4, and to the times $t_a$, $t_b$, $t_c$ and $t_d$, two of these important quantities are:

$$R_{ab} = \frac{\Delta V_{1-0}(\text{at } t_a) - \Delta V_{1-0}(\text{at } t_b)}{\Delta V_{0-2}(\text{at } t_a) - \Delta V_{0-2}(\text{at } t_b)}$$

and $$R_{cd} = \frac{\Delta V_{1-0}(\text{at } t_c) - \Delta V_{1-0}(\text{at } t_d)}{\Delta V_{0-2}(\text{at } t_c) - \Delta V_{0-2}(\text{at } t_d)}$$

In practice, it is desirable to determine at each station, i.e. for each position of the collinear tripole electrode array, about two dozen such values for the desired ratios.

Ratios as defined above indicate relative behavior of the telluric vector. That is, they indicate how the telluric vector behaves in one location with respect to its behavior in another location. For convenience, the two locations concerned in the above definition are considered to be the midpoints between electrodes 1 and 0 and between electrodes 0 and 2. For instance, if R's, as defined are greater than unity, it means that the telluric field is stronger between electrodes 1 and 0 than it is between electrodes 0 and 2. Now, in telluric current theory it is usually assumed that the source of electromotive force that causes the subsurface current to flow behaves as if it were effectively an infinite distance away and tends to cause a uniform current flow and a consequent uniform field everywhere over a large geographical region. When the current flow and the consequent field differ from place to place, the difference may be ascribed to either or both of two major causes. Either the subsurface formations immediately under and around the electrodes differ from each other, or if those formations do not differ in their intensive properties they differ in the way they are bounded. This latter condition is by far the most important one. If the telluric field is stronger at Station A than at Station B it can usually be assumed that the conductive formation under Station A is more closely bounded by some relatively less conductive region than is the formation under Station B. In other words, the current stream lines under Station A are constrained by some nearer relatively resistive subsurface boundaries and squeezed together more closely than those under Station B. This could be due, for instance, to the fact that Station A was relatively nearer to a rising portion of relatively resistive basement rock.

The R values, as defined above, are examined by either human means, or machine means, as shown hereinafter. The manner in which the R values are used may perhaps be test described if it is considered at first that the R-values are merely obtained by human means and more plotted in graphical form.

Figure 5A:
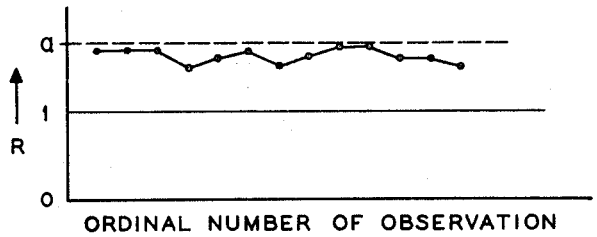
FIGS. 5a through 5e are representations of plotted ratios between observed telluric voltages as observed by the apparatus of FIG. 1.
Figure 5B:
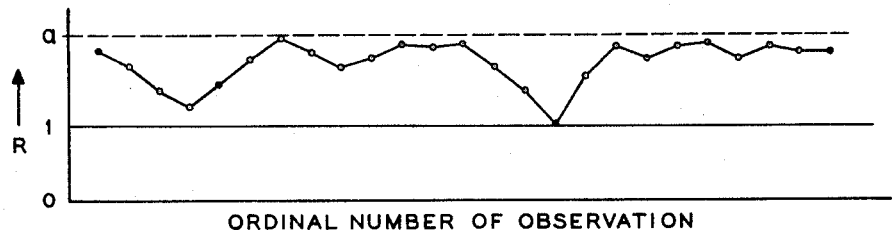
Figure 5C:
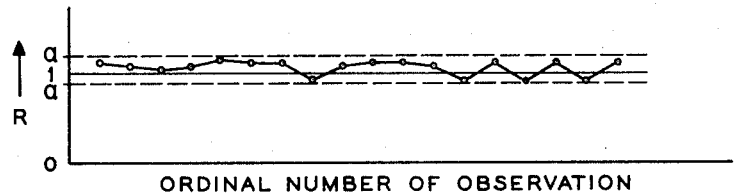
Figure 5D:
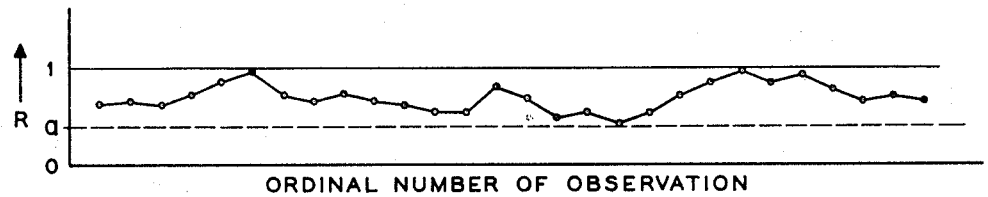
Figure 5E:
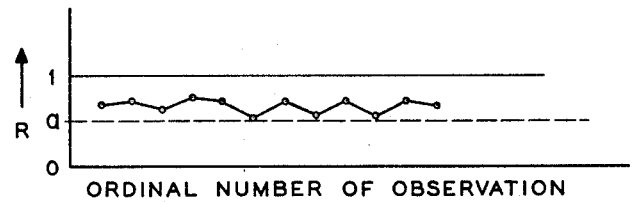

A graph of successive R values will usually appear like one of the plots in FIG. 5a through FIG. 5e. Data from collinear tripoles as described herein, will always give R values in the neighborhood of unity, but the R values may lie rather consistently around some value above or below unity, or they may show a tendency to vary between some value near unity and unity itself. FIGS. 5a and 5e show values tending to lie near limits, marked "a," away from unity. In FIG. 5a, the limit is above unity and in FIG. 5e the limit is below unity. FIGS. 5b and 5d shows values tending to vary between a limit away from unity and unity itself. In FIG. 5b the limit, marked "a" is above unity and in FIG. 5d is is below unity. FIG. 5c shows a set of R values tending to lie around unity itself.

It can be shown theoretically that the types of behavior represented in FIGS. 5a, 5c, and 5e, are limiting types, expectable only when the line of the telluric survey is perpendicular to (FIGS. 5a and 5e) or parallel to (FIG. 5c), the strike of the geologic formations in the region being surveyed. For an arbitrary orientation with respect to the strike, the expectable types of behavior are those shown in FIGS. 5b and 5d. In those cases, it can be shown theoretically that the relative ellipse area of the midpoint between electrodes 1 and 0 with respect to the midpoint between electrodes 0 and 2 is numerically equal to the limit away from unity that the R value tends to approach. That is, the relative ellipse area is the "a" of FIG. 5b or 5d.

If the R value hovers around unity as represented in FIG. 5c, the ellipse area is unity. If the R value does not tend to approach unity, as represented in FIGS. 5a and 5e, it may be satisfactory to pick the ellipse area as the limit away from unity toward which the R values cluster, but a more rigorous interpretation is obtained from the following rule: If the ratio R varies within a range, $R_{max} - R_{min}$, which is less than the difference between the average R and unity, then the ellipse area is $R_{avg}$. Mathematically:

$$\text{If } |R_{max} - R_{min}| < |R_{avg} - 1|$$
$$\text{then } a = R_{avg}$$

Having determined the relative ellipse area at one position of the collinear tripole electrode array, the telluric survey may be continued along the survey line by removing one electrode within the array and moving it on, in leap frog fashion, ahead of the other pair of electrodes. A new set of telluric current measurements may then be made to establish the relative ellipse area for the new electrode positions. Each of the ellipse areas measured in this manner will be relative to the ellipse area of the other pair of electrodes within the array. As the measurements continue along the survey line, it is possible for cumulative errors to develop so that although the relative value between, say, the tenth and the ninth stations is quite accurate, the relative value between the tenth and the first stations would be in some doubt. It is possible for there to be of the order of nine times as much error between these two values as between two values for adjacent stations. However, this is highly improbable because the usual errors do not tend to accumulate unidirectionally. Even if they did, the result would not be seriously detrimental to the present method. One of the great advantages of the method is that it has higher local precision, which enables the method to show up small relative changes in neighborhood values, and these changes are the desired clues to subsurface stratal changes.

A telluric current survey to produce relative ellipse areas of the type herein described is easily accomplished with a minimum field crew. The present method has eliminated the base station measurement and has permitted the survey to be run with only a single crew. The actual crew may be reduced to a minimum in that after the electrodes have been properly positioned and electrically connected to the illustrated voltage measurement equipment, the entire method may be performed automatically and the eventual results may be presented as an output from an automatic apparatus. Such an automatic apparatus is illustrated in FIG. 6.

Figure 6:
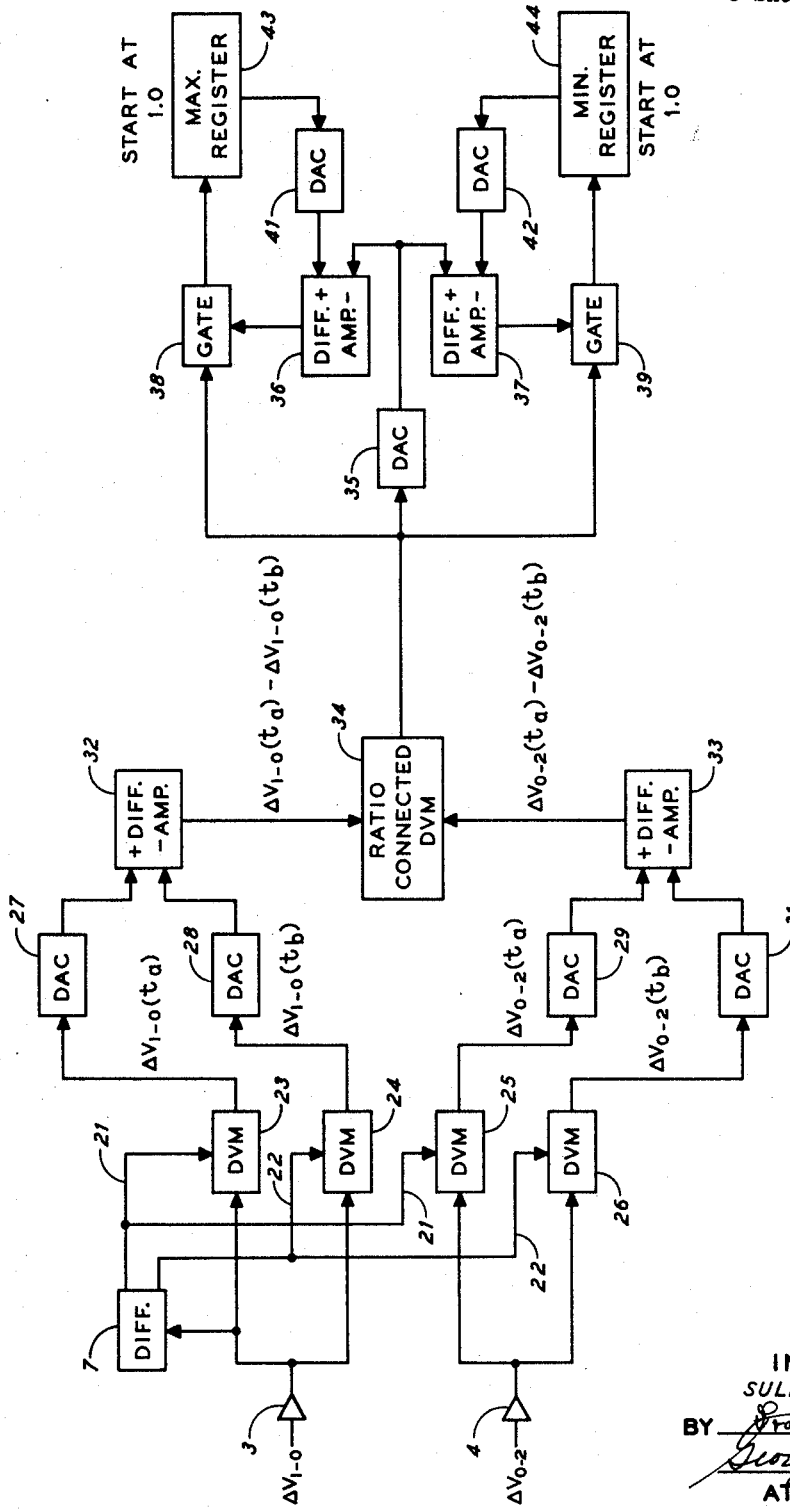
FIG. 6 is a schematic illustration in block diagram form of an apparatus for automatically processing the data of a record as illustrated in FIG. 3 to derive indications of relative ellipse area values from a field measurement of telluric voltages.

In FIG. 6 of the drawings an apparatus is illustrated that may be employed for automatically processing the data that is derived from the collinear tripole electrode ray of FIG. 1. In this figure, as in FIG. 2, the changing voltage $\Delta V_{1-0}$ is fed to amplifier 3 and the changing voltage $\Delta V_{0-2}$ is fed to amplifier 4. The voltage $\Delta V_{1-0}$ is also fed to the differentiator 7 for development of a keying pulse at conductor 21 indicating the attainment of a maximum in the input voltage. The maximum keying pulse is followed by a second keying pulse at conductor 22 indicating the attainment of the first minimum following the maximum indicated on conductor 21. During the period that the differentiator 7 is sensing voltage variations, $\Delta V_{1-0}$ is applied to digital voltmeters (DVM) 23 and 24, and $\Delta V_{0-2}$ is applied to differential voltmeters (DVM) 25 and 26. When a maximum is detected by differentiator 7, the keying pulse on conductor 21 is applied to digital voltmeter 23 and to digital voltmeter 25 to mark the instantaneous voltage readings in these digital voltmeters. When the following minimum is detected by the differentiator 7, a keying pulse is provided on conductor 22 to the digital voltmeters 24 and 26 to lock these voltmeters at their then instantaneous reading. After a small time delay following the sensing of the minimum by the differentiator 7, the readings of the digital voltmeters 23–26 are applied to digital-to-analog converters (DAC) 27, 28, 29, and 31. The inputs to these individual converters are, as is shown in the connecting conductors between the voltmeter and the converter, $\Delta V_{1-0}(t_a)$, $\Delta V_{1-0}(t_b)$, $\Delta V_{0-2}(t_a)$, and $\Delta V_{0-2}(t_b)$. Having transferred these voltage readings to the converters 27–31, the differentiator 7 resets the readings on the individual differential voltmeters 23–26 and prepares the voltmeters for the analysis of the next signal maximum and minimum appearing in the input telluric voltage readings.

The digital-to-analog converters 27–31 apply their respective readings to differential amplifiers 32 and 33 where the input voltages in analog form are subtracted to provide those portions of the previously identified equation constituting:

$$\Delta V_{1-0}(t_a) - \Delta V_{1-0}(t_b)$$

and $$\Delta V_{0-2}(t_a) - \Delta V_{0-2}(t_b)$$

These two subtracted voltages are applied to a ratio-connected digital voltmeter (DVM) 34 where the ratio of the two input voltages is produced in the form shown at the left center of FIG. 6.

The ratio provided by the ratio-connected digital voltmeter 34 is one of the several ratios to be automatically provided by the apparatus illustrated in FIG. 6, and the continued production of these individual ratios is insured by the resetting and re-energization of the digital voltmeters 23–26 by the differentiator 7 on subsequent maxima and minima as provided in keying pulses on conductors 21 and 22. Each ratio from the digital voltmeter 34 is applied to a digital-to-analog converter (DAC) 35 where the digital reading of the ratio is converted to an analog signal for application to a pair of differential amplifiers 36 and 37.

The ratios from the voltmeter 34 are also applied to a pair of gates 38 and 39 that, under normal circumstances, block the ratio indication from the output of the gate circuits. The differential amplifiers 36 and 37 are intended to compare the ratio signal provided from the converter 35 to a second analog signal from digital-to-analog converters 41 and 42 and to detect a difference indication between the provided ratio signal and the reference signal from the converters 41 and 42. The reference signal to these analog converters 41 and 42 are provided from a maximum register 43 and from a minimum register 44, respectively.

The simplest explanation of the operation of the just described portions of the FIG. 6 apparatus is provided by examining the operation of the circuit with the input of a first ratio signal. In initial preset condition, the maximum register starts at an indication of 1 and increases in a positive direction from this number. The minimum register 44 starts at an indication of 1 and reduces this number in a negative-going direction toward the number zero as ratios are compared. With the maximum register 43 starting at a 1 position, the digital-to-analog converter 41 provides as its output an analog signal of the reading of the register or an indication of a ratio of 1. At the same time the ratio determined by the digital voltmeter 34 is provided through the digital-to-analog converter 35 to the differential amplifier 36, and is there compared to the output of the digital-to-analog converter 41. If the ratio indication from the converter 35 is larger than the signal from the converter 41, a gate signal is applied to the gate 38 and the ratio from the digital voltmeter 34 is applied through the gate 38 to the maximum register 43. This new ratio then adjusts the register to indicate the newly determined ratio. Thereafter, each newly determined ratio from the ratio-connected digital voltmeter 34 is applied through the digital-to-analog converter 35 to the differential amplifier 36 and there compared to the maximum register signal as converted to analog form by the digital-to-analog converter 41. Whenever the determined ratio is larger than the register reading, a gate signal is applied to the gate 38 to change the register reading in accordance with the newly determined ratio.

The same operations are performed by the gate 39, minimum register 44, digital-to-analog converter 42 and differential amplifier 37 for ratio determinations less than 1. The first ratio indication less than 1 is compared in the differential amplifier 37 to the minimum register indication of 1 as converted by the digital-to-analog converter 42 to provide a gate signal to the gate 39 to decrease the minimum register reading in accordance with the first ratio determination. Subsequent ratio determinations are compared in the differential amplifier 37 to the register reading and, when the ratio is less than that previously recorded in the register, the gate 39 is opened and the register is readjusted to the newly determined ratio.

With the operation of the apparatus as illustrated in FIG. 6 the maximum register 43 and the minimum register 44 will provide indications of the "a" values as illustrated in FIGS. 5a through 5e. The registers will indicate the attained maximum for ratios as illustrated in FIGS. 5a and b, and will indicate minimums for the ratios illustrated in FIGS. 5d and e. For the ratios as illustrated in FIG. 5c, both maximum and minimum registers will indicate numbers very closely approximating 1, and a ratio determination of this type may be easily identified by simultaneous indications in the two registers.

Each of the individual circuits shown in block form in FIG. 6 are readily available under the names identified in each block. The ratio-connected digital voltmeter 34 is the same as the digital voltmeters 23–26 with the exception that the voltmeters 23–26 are provided with a reference voltage whereas the ratio-connected digital voltmeter compares the two difference voltages determined in the differential amplifiers 32 and 33, rather than comparing one single voltage to a reference voltage. An alternative form of apparatus known as a "sample and hold mechanism" may be employed in the left-hand portions of FIG. 6 as a substitute for the digital voltmeters and digital-to-analog converters. With that form of apparatus, the signal applied to the differential amplifiers 32 and 33 would be direct analog indications of the attained maximums and minimums in the input signals and the differential amplifiers would continue to provide the same difference output as is indicated on the conductors of the illustrated block diagram. Apparatus of the form illustrated in FIG. 6 has been selected for explanation of the operation of the present invention because it most closely follows the mathematical process to be performed in the determination of the ratio indications for identification of relative ellipse areas.

While certain preferred embodiments of the invention have been specifically disclosed, it is understood that the invention is not limited thereto, as many variations will be readily apparent to those skilled in the art, and the invention is to be given its broadest possible interpretation within the terms of the following claims.

I claim:

1. A telluric current prospecting method for determining the relative ellipse area of selected locations in a survey line across the earth's surface comprising the steps of:
    (a) measuring as a continuous function of time a first voltage between one end electrode and the middle electrode of a collinear three electrode array, simultaneously measuring as a continuous function of time a second voltage between said middle electrode and the other end electrode of said collinear three electrode array;
    (b) determining the voltage change in said first voltage during a plurality of intervals of time during the measurement of said first voltage;
    (c) determining the change in said second voltage during each of the same intervals of time;
    (d) correlating the change in said first and said second voltage during each of said intervals of time to derive a ratio between the changes in said two voltages for each of said intervals of time;
    (e) and determining the limit between which limit and unity said ratios cluster, said limit being numerically equal to said sought relative ellipse area.

2. A telluric current prospecting method for determining the relative ellipse area of selected locations in a survey line across the earth's surface comprising the steps of:
    (a) measuring as a continuous function of time a first voltage between one end electrode and the middle electrode of a collinear three electrode array, simultaneously measuring as a continuous function of time a second voltage between said middle electrode and the other end electrode of said collinear three electrode array;
    (b) determining the change in said first voltage during an interval of time and determining the corresponding change in said second voltage during the same interval of time;
    (c) recording the ratio of the change in said first voltage to the change in said second voltage;
    (d) repeating the above determining and recording steps a plurality of times;
    (e) and determining the limit between which limit and unity said plurality of ratios cluster, said limit being numerically equal to said sought relative ellipse area.

3. A telluric current prospecting method for determining the relative ellipse area of selected locations in a survey line along the earth's surface comprising the steps of:
    (a) measuring as a continuous function of time a first voltage between one end electrode and the middle electrode of a collinear three electrode array, simultaneously measuring as a continuous function of time a second voltage between said middle electrode and the other end electrode of said collinear three electrode array;
    (b) determining the change in said first voltage during an interval of time and determining the corresponding change in said second voltage during the same interval of time, comparing the determined change in said first voltage to the determined change in said second voltage to derive a ratio of said determined changes;
    (c) recording the ratio of the change in said first voltage to the change in said second voltage;
    (d) repeating the above determining, comparing and recording steps a plurality of times for additional intervals of time within the time period during which said continuous measurements of said first and second voltages are taken;
    (e) determining the limit between which limit and unity the plurality of ratios cluster, said limit being numerically equal to said sought relative ellipse area;
    (f) moving said collinear three electrode array to additional successive locations along said survey line with at least one electrode position in each successive array location being common to an electrode position in the previous array location;
    (g) repeating the above relative ellipse area determination steps for each successive location of said collinear three electrode array;
    (h) and plotting said determined relative ellipse areas on a representation of the survey line on a map of the earth's surface being surveyed.

4. A telluric current prospecting method for determining the relative ellipse area of selected locations in a survey line along the earth's surface comprising the steps of:
    (a) measuring as a continuous function of time a first voltage between one end electrode and the middle electrode of a collinear three electrode array, simultaneously measuring as a continuous function of time a second voltage between said middle electrode and the other end electrode of said collinear three electrode array;
    (b) determining the value of said first voltage upon attainment of a measured maximum, determining the value of said second voltage at the time of said attainment of said maximum in said first voltage;
    (c) determining the value of said first voltage upon attainment of a first minimum after said attained maximum, determining the value of said second voltage at the time of said attainment of said first minimum in said first voltage;
    (d) subtracting said minimum first voltage value from said maximum first voltage value to derive a value for the change in said first voltage during a period of time, subtracting the value of said second voltage at the time of said first voltage minimum from the value of said second voltage at the time of said first voltage maximum to derive a value for the change in said second voltage during the same period of time;
    (e) comparing said derived first voltage value of change to said second voltage value of change to determine a ratio of change in said first and second voltage in said period of time;
    (f) recording the ratio of the change in said first voltage to the change in said second voltage;
    (g) repeating the above determining, subtracting and comparing steps a plurality of times for additional intervals of time within said continuous measurements of said first and second voltages;
    (h) determining the limit between which limit and unity the plurality of ratios cluster, said limit being numerically equal to said sought relative ellipse area.

5. A method for determining the relative ellipse area of a first location with respect to an adjacent second location along a survey line on the surface of the earth comprising the steps of:
    (a) measuring as a continuous function of time a voltage representative of the telluric field vector parallel to said survey line and between a first pair of fixed points including said first location;
    (b) simultaneously measuring as a continuous function of time a voltage representative of the telluric field vector parallel to said survey line and between a second pair of fixed points including said second location; said first pair and said second pair of points being on said survey line and including a mutually common point to define a collinear three point alignment along said survey line;

(c) recording variations in said simultaneously measured voltages for a predetermined period of time;

(d) designating a plurality of selected time intervals identically on each of said recorded voltages;

(e) determining the change in voltage in each of said recorded voltages during said selected time intervals of said records;

(f) determining the ratio between the change in said first voltage and the change in said second voltage during each of said selected time intervals;

(g) and correlating said ratios to determine the limit between which limit and unity said ratios cluster, said limit being numerically equal to said sought relative ellipse area.

References Cited by the Examiner

UNITED STATES PATENTS

| | | | |
|---|---|---|---|
| 2,240,520 | 5/41 | Schlumberger | 324—1 |
| 2,284,990 | 6/42 | Schlumberger | 324—1 |
| 2,586,667 | 2/52 | Kunetz | 324—1 |

WALTER L. CARLSON, *Primary Examiner.*

LLOYD McCOLLUM, *Examiner.*